July 29, 1969     E. R. MARTIN     3,458,101

FLYWHEEL STORAGE MEANS FOR INERTIAL BONDING MACHINES

Filed March 28, 1967     4 Sheets-Sheet 1

INVENTOR.
EUGENE R. MARTIN

BY
ATTORNEYS

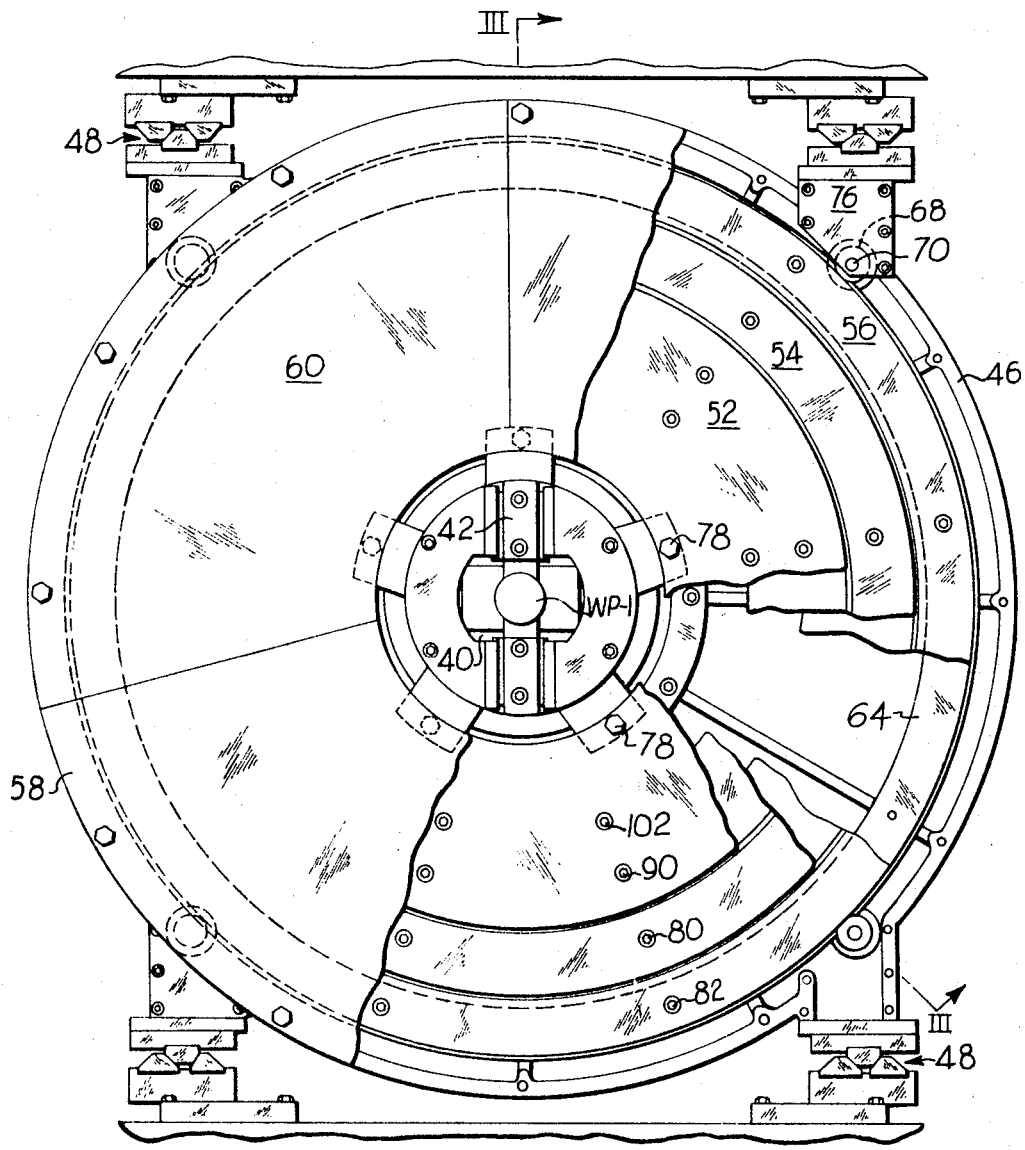
Fig-2-

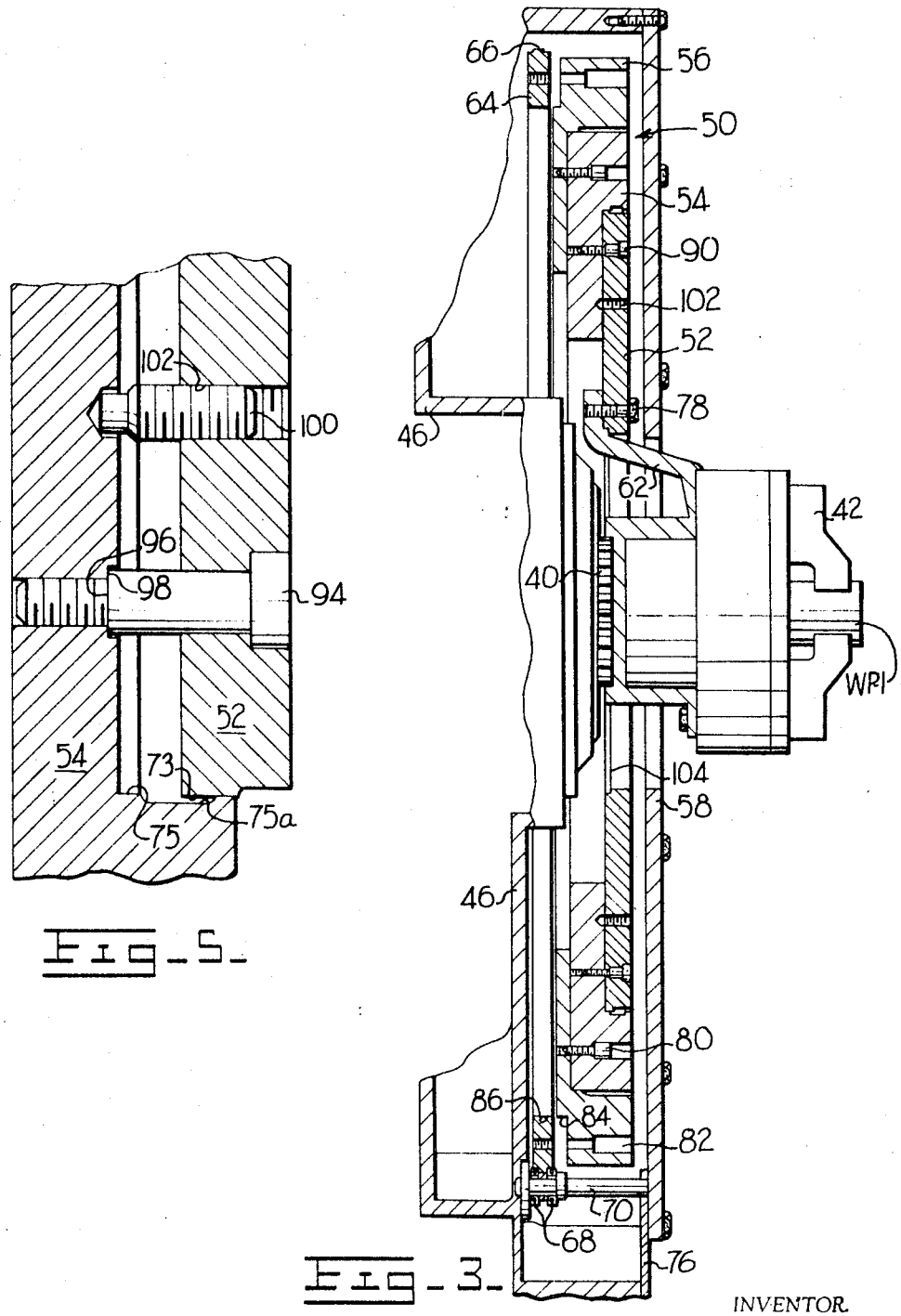

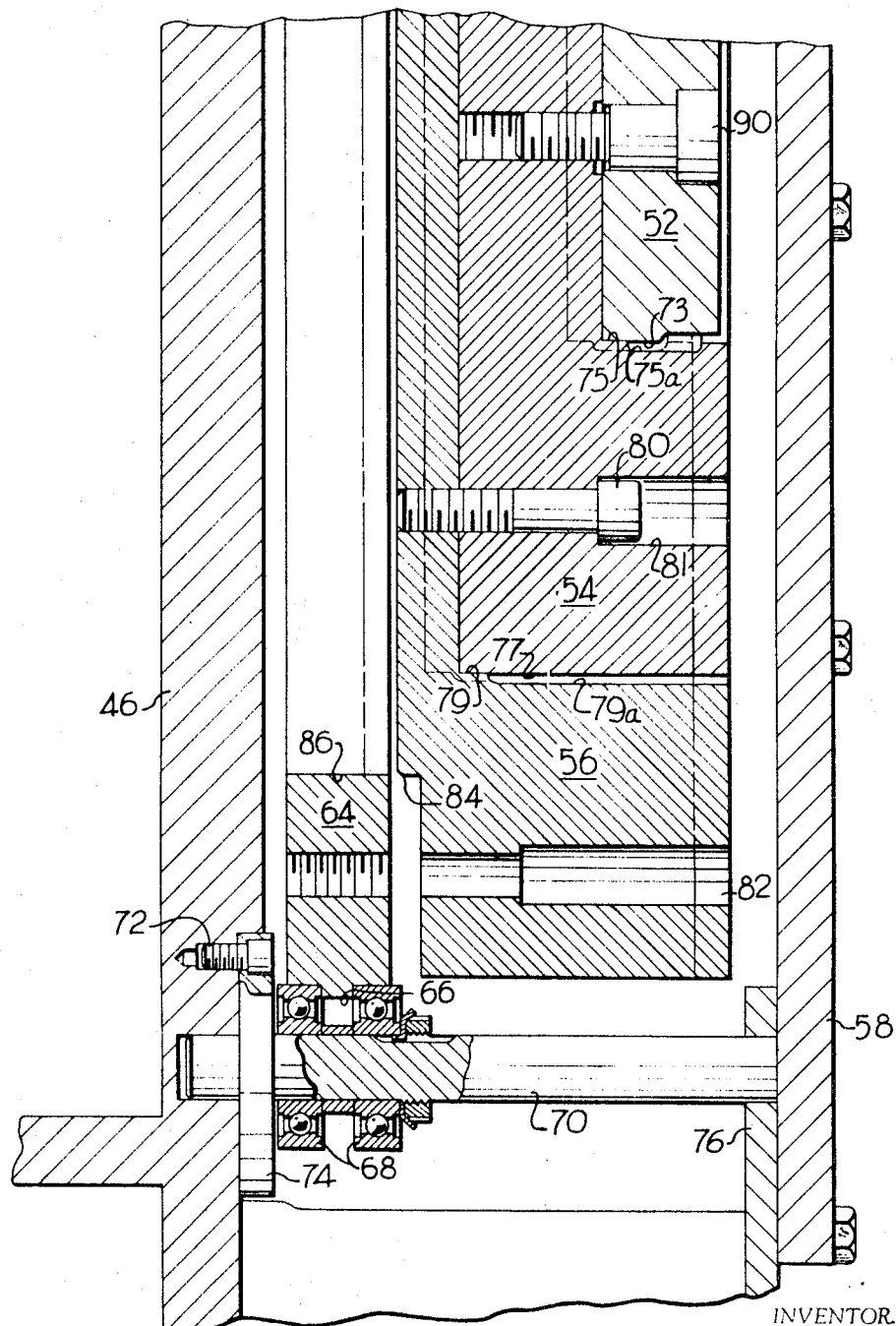
Fig_4_

United States Patent Office 3,458,101
Patented July 29, 1969

3,458,101
FLYWHEEL STORAGE MEANS FOR INERTIAL
BONDING MACHINES
Eugene R. Martin, East Peoria, Ill., assignor to Caterpillar Tractor Co., Peoria, Ill., a corporation of California
Filed Mar. 28, 1967, Ser. No. 626,538
Int. Cl. B23k 27/00
U.S. Cl. 228—2                                      10 Claims

ABSTRACT OF THE DISCLOSURE

Flywheel storage means for storing a plurality of concentrically mating, annular, inertial flywheel weights adjacent to and coaxial with the rotating spindle to which they are connected when used; the flywheels having means to connect and disconnect various combinations thereof with a minimum of effort and maximum safety.

Background of the invention

This invention relates to bonding machines of the kind wherein two parts to be bonded are engaged in rubbing contact at a common interface to heat the interface to a bondable condition. This invention has particular application to a bonding machine of this general type wherein the energy required to bring the interface to a bondable condition is stored as kinetic energy in rotating inertial weights. These weights take the form of annular flywheels and are connected to one of the parts and the entire energy necessary to form the bond is stored in the weights prior to engagement of the parts at the interface. The stored energy is discharged into the interface through the frictional heating and plastic working developed at the interface as the rubbing contact slows the rotating inertial weights to a stop at the conclusion of a bonding cycle.

A bonding machine should be capable of producing bonds between parts of varied sizes, shapes and materials. Different materials and different sizes and shapes of parts require different amounts of energy. The size of the inertial weight must be matched to the size, shape and composition of the parts to be bonded.

As bonding machines of the subject type become larger and more versatile, to accommodate different size parts on the same machine, it is necessary in most cases to increase or decrease the flywheel mass or weight for each size part to be bonded. To accommodate larger parts, large diameter flywheels are used that are extremely heavy, such for example as 4,000 pounds and over. These large inertial weights are cumbersome and difficult to handle as well as presenting a safety hazard to the machine operator. Thus, the complexity of the machines and the close quarters in which the flywheels must be assembled and disassembled require special provisions for handling. Due to their size, it is desirable that the flywheels be stored adjacent to and coaxial with the rotating spindle or chuck to which they are connected when used. Since various combinations of flywheels are used for different sizes of parts to be bonded, provisions must be made to connect and disconnect these combinations with a minimum of effort and maximum safety.

Difficult alignment problems are encountered when attempts are made to store various sizes of flywheels in coaxial relationship with respect to a horizontal spindle. Special supporting means are required for the various flywheels so that they may be easily connected or disconnected from each other and also with the spindle. It is also necessary that the storage means for storing unused flywheels support them in a position where they do not interfere with the operation of the machine.

It is a primary object of the present invention to store all of the inertial weights close to the rotary spindle which carries one of the parts to be bonded. Any desired number of weights can be attached to the spindle, and the remaining weights are retained in the stored position.

It is a related object of the invention to store the weights in a manner such that the weights may be quickly and easily attached to or detached from each other and/or the spindle.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Brief description of the drawing

FIG. 2 is a front elevation, partly broken away, illustrating the relationship between a workpiece spindle, a group of inertial flywheel weights, and the storage means for the flywheel weights;

FIG. 3 is a cross-sectional view taken on the line III—III of FIG. 2; and

FIGS. 4 and 5 are enlarged sectional views illustrating various details of the flywheel storage means and the means for connecting and disconnecting the flywheels with each other and said storage means.

Description of the preferred embodiment

Figure 1:
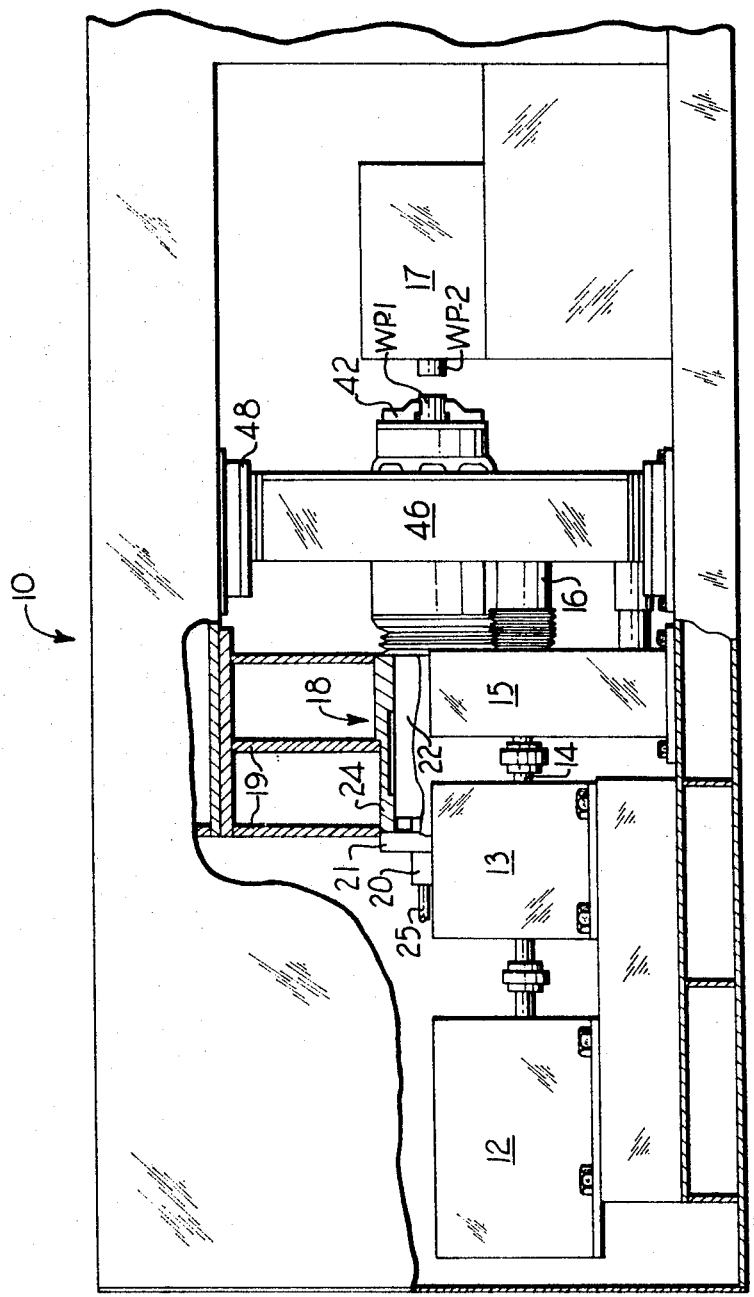
FIG. 1 is a side elevation, partly broken away, illustrating a bonding machine constructed in accordance with one embodiment of the present invention.

FIG. 1 illustrates a preferred embodiment in which the invention is employed in a horizontally oriented bonding machine shown generally at 10. In the embodiment shown in FIG. 1, a pair of electric motors, one of which is shown at 12, are drivingly connected to the input side of a pair of water-cooled eddy current couplings 13. The output sides of eddy current couplings 13 are drivingly connected by shafts 14 to the input shafts of a pair of gear transfer mechanisms 15. The output shafts of transfer mechanisms 15 extend through telescopic housings 16 into the spindle and flywheel housing 46. A gear carried on the end of the transfer mechanism output shaft meshes with a suitable gear on the spindle 40 for driving the spindle and an associated rotary chuck 42, thereby providing relative rotation between a first workpiece WP-1 and a second stationary workpiece WP-2. The workpiece WP-2 may be held stationary in any suitable fixture as illustrated at 17.

The rotary chuck 42 and the flywheel and spindle housing 46 are axially movable with respect to the remainder of the machine for bringing the workpieces WP-1 and WP-2 into contact under pressure for bonding. Such axial movement of the spindle assembly is accomplished by a load cylinder mechanism indicated generally at 18, which mechanism is supported within the machine framework 19. Broadly, the mechanism comprises a rod and piston assembly 20 which is secured to the machine framework 19 by a flange 21. The piston end of the assembly 20 extends into an axially movable cylinder 22, the right end of which is connected to the spindle assembly. Cylinder 22 slidably surrounds the rod and piston assembly 20 and is reciprocably mounted in a cylindrical portion 24 of the machine frame. Fluid may be introduced to chambers in either end of cylinder 22 through a pair of passages, one of which is shown at 25.

It should be apparent that when fluid pressure is communicated to the head end of cylinder 22 the spindle assembly will be moved rightwardly as viewed in FIG. 1 to bring the parts to be bonded into contact under pressure. After the bonding operation is completed and the opposite end of the bonded assembly has been removed from fixture 17, fluid under pressure may be communicated to the rod end of the cylinder 22 for moving the cylinder and spindle assembly to the left in ready position for another bonding operation.

Referring now to FIGS. 2 and 3 in conjunction with FIG. 1, a horizontal rotary spindle 40 of an inertial welder has secured at its front face a chuck 42 to clamp and support a part WP-1 for relative rotation with respect to a stationary part on the right hand end of the machine. A large cast housing 46 is supported in upper and lower machine guides or ways 48 for reciprocating motion with the spindle and rotary chuck. The housing 46 contains a storage area for the flywheels which are indicated generally at 50. The flywheels per se comprise a plurality of annular or ring shaped elements which are preferably constructed of metal or the like. In the particular embodiment shown, three such annular flywheels 52, 54 and 56 are shown although it is to be understood that any suitable number of such elements could be utilized. Covering the front of the housing is a face plate 58. Face plate 58 has a removable, segmented portion 60 representing substantially a quartersection for acess to the flywheels.

As best shown in FIG. 3, the rotary chuck 42 is secured to a spindle casting 62 which casting also supports the flywheels for rotation with the chuck. The flywheel storage means comprises a freely rotating master ring 64 situated within housing 46 and provided at its outer diameter with an external flange 66 which flange is contained between a plurality of properly spaced bearings 68. As best shown in FIG. 4, the bearings 68 are supported on shafts 70 rigidly secured to the housing 46 by capped screws 72 which extend through flanges 74 formed on the shafts. The opposite ends of the shafts 70 extend through and are supported by the small inset plates 76 formed on the housing 46.

When various parts of different sizes are to be bonded on the same machine, it may be necessary to increase or decrease the flywheel inertial energy for each size of part. For example, either all or none of the flywheels 52, 54 or 56 may be used, depending upon the size of the part to be bonded. As shown in FIG. 3, all three of the flywheels are used and are attached to one another and to the rotating spindle casting 62 by means of a plurality of bolts 78. If bonding conditions dictate that all but the outer flywheel 56 be used in the bonding process, this flywheel can be stored in a dormant condition on master ring 64 so as not to interfere with the operation of the machine. To accomplish this operation, a plurality of cap screws 80, used to secure flywheel 54 to flywheel 56, are removed and an appropriate number of cap screws (not shown) are inserted in holes 82 of flywheel 56 and gradually tightened to force an outer diameter portion 84 of flywheel 56 into sliding engagement with the internal bore 86 of storage ring 64.

It should be noted that access to all of the cap screws joining the flywheels to each other and to the master ring may be gained by removing the segmented portion 60 of the cover plate 58 and rotating the flywheels by hand to expose the various cap screws. It should be further observed that each of the flywheels 52, 54 and 56 are provided with internal and external mating diameter portions denoted respectively in FIG. 4 at 73, 75; 77, 79 and 84, 86 which cooperate with each other to insure that the flywheels are always coaxially aligned with the spindle 40 whenever they are moved axially into a connected or disconnected position. Thus, for example, should flywheel 56 be disconnected from flywheel 54 and moved toward storage ring 64 it will be observed that outer diameter portion 84 will engage the bore 86 of storage ring 64 prior to disengagement of flywheel internal diameter 79 from outer diameter portion 77 of flywheel 54. Further, it will be observed that the internal diameter portion 79 of flywheel 56 is formed with a stepped shoulder portion 79a which provides clearance when flywheel 54 is active and flywheel 56 is stored on ring 64.

If only flywheel 52 is needed in a particular bonding process, flywheel 54 could have been removed to the storage ring along with flywheel 56 as in the operation previously described, by merely removing a set of cap screws 90 which secure flywheel 54 to flywheel 52 rather than removing cap screws 80 which secure flywheel 54 to flywheel 56. However, should the sequence of operations be such that the flywheel 56 was already in stored position on master ring 64 the flywheel 54 would be moved to the storage area as follows: after removing cap screws 90, the cap screws 80 are inserted in holes 81 and aligned with mating holes in flywheel 56 by rotating flywheel 56 and master ring 64 to which it is attached and subsequently tightening cap screws 80 until flywheel 54 is secured inside the inner diameter portion 79 of flywheel 56. Again it is noted that the outer diameter portion 77 of flywheel 54 will engage the inner diameter portion 79 of flywheel 56 prior to disengagement of the inner diameter portion 75 of flywheel 54 with the outer diameter portion 73 of flywheel 52, thus insuring that the flywheels are at all times kept in proper alignment with the spindle. Further, inner diameter portion 75 is provided with a groove 75a which, as shown in phantom outline in FIG. 4 provides clearance when flywheel 54 is stored and flywheel 52 is active.

Again, depending upon the size of the parts to be bonded, it may be required that none of the flywheels be used in the bonding process since the rotating spindle and chuck have sufficient inertial energy to initiate the bonding process. Thus, flywheel 52 may be removed and stored in dormant condition on the master ring 64 by removing bolts 78 which join flywheel 52 to spindle casting 62 and then inserting a plurality of shoulder screws 94 (see FIG. 5) in the holes previously used to join flywheels 52 and 54. Shoulder screws 94 are then tightened until the bottom shoulder face 96 of the screws are flush with the shallow counterbore 98 in flywheel 54. A plurality of dog-point jack screws 100 are then inserted in holes 102 of flywheel 52 and tightened until flywheel 52 is forced away from spindle casting 62 and into contact with the head portions of shoulder screws 94. To insure alignment of the outer diameter of flywheel 52 with the internal diameter portion 75 of flywheel 54, an internal bore 104 of flywheel 52 is piloted on spindle casting 62 until contact is again established with flywheel 54 at the inner diameter portion 75 on the other side of groove 75a. Shoulder screws 94 also act as piloting means for flywheel 52 such that in most instances it is unnecessary that the flywheel 52 have piloting contact with the inner diameter 75 of flywheel 54 when flywheel 52 is in stored position. Thus, all the flywheels are supported on the master ring 64 in a dormant condition such that they do not interfere with the operation of the machine.

Though not shown in the drawings, each of flywheels 54 and 56 are provided with jack screws similar to that shown at 100 for moving them away from the storage ring 64 for connection with the spindle. With the apparatus described many different combinations of flywheels may be used as desired to bond specific parts together. All of the inter-fitting diameters and bores of the flywheels 52, 54 and 56 have slight lead-in chamfers to aid in their assembly. Nonetheless, care must be taken in tightening and loosening the flywheels, which is generally done in a diametrically-opposite pattern, since uneven tightening might cock the flywheels within their mating bores and thus hamper their assembly and disassembly.

I claim:
1. An inertial bonding machine of the kind wherein two parts are engaged in rubbing contact at a common interface while kinetic energy stored in rotating inertial weights is discharged into the interface through frictional heating and plastic working developed at the interface as the rubbing contact slows the rotating inertial weights to a stop at the conclusion of the bonding cycle, said machine comprising, a rotary spindle for rotating one part; a plurality of concentrically mating, annular, inertial flywheel weights, said flywheel weights having progressively larger outside diameters; attaching means for attaching a selected number of said inertial weights to the rotary spindle; and storage means encircling the rotary spindle for storing inertial weights not needed for making a particular bond.

2. A bonding machine as defined in claim 1 wherein the spindle extends in a horizontal direction; said storage means includes a master ring adjacent to and coaxial with said horizontal spindle and said weights concentrically interfit with one another and with the master ring so that said weights may be stored in aligned position and out of contact with said rotary spindle.

3. A bonding machine as set forth in claim 2 wherein said master ring is rotatably secured to a housing member by means independent of said rotary spindle.

4. A bonding machine as set forth in claim 2 having movable means carried by each of said flywheels for moving them axially toward and away from said master ring.

5. A bonding machine as set forth in claim 4 wherein said movable means comprise threaded fasteners.

6. A bonding machine as set forth in claim 4 wherein at least one of said weights moves axially away from said storage means for storage with the remaining weights moving axially toward said storage means for storage.

7. A bonding machine as set forth in claim 4 wherein the radially innermost weight moves axially toward said spindle and away from said storage means for storage with the remaining weights moving axially away from said spindle and toward said storage means for storage.

8. A bonding machine as set forth in claim 3 wherein said housing is provided with an annular cover plate which extends radially inwardly to a position adjacent said spindle to shield said flywheel weights; said cover member having a removable portion for permitting access to said weights and said storage means.

9. A bonding machine as set forth in claim 1 wherein said storage means is provided with means for concentrically engaging the radially outermost of said inertial weights whenever said weight is moved axially away from said spindle toward said storage means, the engagement occurring prior to the disengagement of said weight with a radially inwardly adjacent weight.

10. A bonding machine as set forth in claim 9 wherein each of said annular inertial weights is provided with means for concentrically engaging the next radially outer adjacent weight whenever said weight is moved axially away from said spindle, said last mentioned engagement occurring prior to disengagement of said weight with a radially inwardly adjacent weight.

References Cited

UNITED STATES PATENTS

| | | | |
|---|---|---|---|
| 3,349,982 | 10/1967 | Lipp | 228—2 |
| 3,235,158 | 2/1966 | Hollander | 228—2 |

RICHARD H. EANES, JR., Primary Examiner